(12) United States Patent
Tyler

(10) Patent No.: US 9,937,962 B1
(45) Date of Patent: Apr. 10, 2018

(54) TRUCK BED EXTENSION SYSTEM

(71) Applicant: Walter Tyler, Pelham, AL (US)

(72) Inventor: Walter Tyler, Pelham, AL (US)

( * ) Notice: Subject to any disclaimer, the term of this patent is extended or adjusted under 35 U.S.C. 154(b) by 0 days.

(21) Appl. No.: 15/478,961

(22) Filed: Apr. 4, 2017

(51) Int. Cl.
*B62D 33/03* (2006.01)
*B62D 33/033* (2006.01)
*B62D 27/06* (2006.01)

(52) U.S. Cl.
CPC ......... *B62D 33/033* (2013.01); *B62D 27/065* (2013.01); *B60Y 2200/141* (2013.01)

(58) Field of Classification Search
CPC .............................. B62D 33/033; B62D 27/065
USPC .. 296/26.04, 26.05, 36, 183.1, 186.1, 186.4, 296/186.5
See application file for complete search history.

(56) References Cited

U.S. PATENT DOCUMENTS

| | | | | |
|---|---|---|---|---|
| 4,703,969 A * | 11/1987 | Rayburn | ................ | B62D 33/08 296/10 |
| 4,784,429 A * | 11/1988 | Hodges | .................... | B60J 7/041 160/202 |
| 4,906,038 A * | 3/1990 | Morris | ...................... | B60P 3/04 296/14 |
| 4,974,898 A * | 12/1990 | Baranski | .................. | B60J 7/047 160/202 |
| 6,152,510 A | 11/2000 | Newsome | | |
| 6,332,637 B1 | 12/2001 | Chambers | | |
| 6,592,162 B2 | 7/2003 | Felix et al. | | |
| D501,443 S | 2/2005 | Jones, Sr. et al. | | |
| 7,758,091 B1 * | 7/2010 | McCall | ..................... | B60P 3/40 224/405 |
| 7,819,295 B2 | 10/2010 | Plavetich | | |
| 8,857,880 B2 | 10/2014 | Kalergis et al. | | |
| 2003/0098590 A1 | 5/2003 | Chechuck | | |

FOREIGN PATENT DOCUMENTS

WO     WO2015017063        2/2015

* cited by examiner

*Primary Examiner* — Joseph D. Pape

(57) ABSTRACT

A truck bed extension system for increasing a height of a truck bed includes a vehicle that has a bed. A plurality of wall units is provided and each of the wall units is removably coupled to the bed. Each of the wall units is vertically oriented on the top edge such that each of the wall units increases a depth of the bed. In this way the bed may carry an object that would otherwise be too tall.

14 Claims, 5 Drawing Sheets

TRUCK BED EXTENSION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to extension devices and more particularly pertains to a new extension device for increasing a height of a truck bed.

BRIEF SUMMARY OF THE INVENTION

An embodiment of the disclosure meets the needs presented above by generally comprising a vehicle that has a bed. A plurality of wall units is provided and each of the wall units is removably coupled to the bed. Each of the wall units is vertically oriented on the top edge such that each of the wall units increases a depth of the bed. In this way the bed may carry an object that would otherwise be too tall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
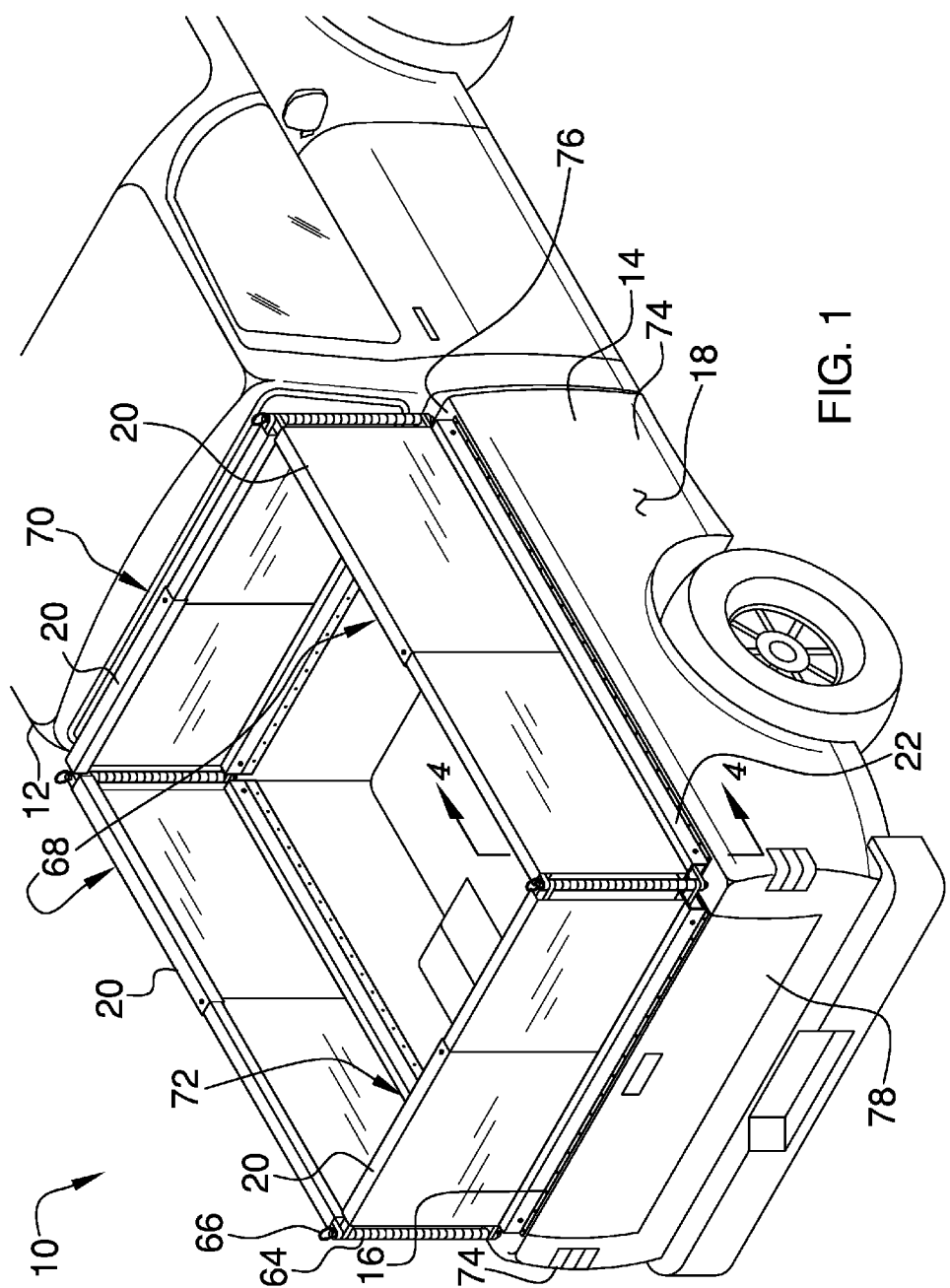
FIG. 1 is a top perspective view of a truck bed extension system according to an embodiment of the disclosure.
Figure 2:
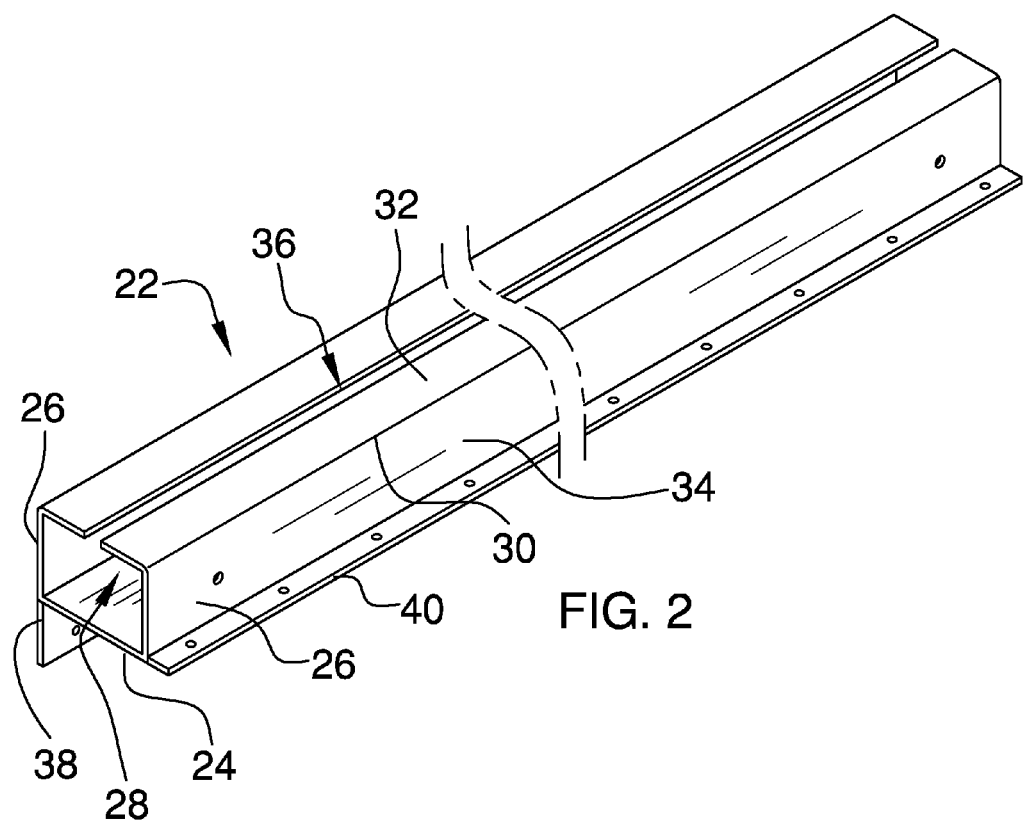
FIG. 2 is a perspective view of a track of an embodiment of the disclosure.
Figure 3:
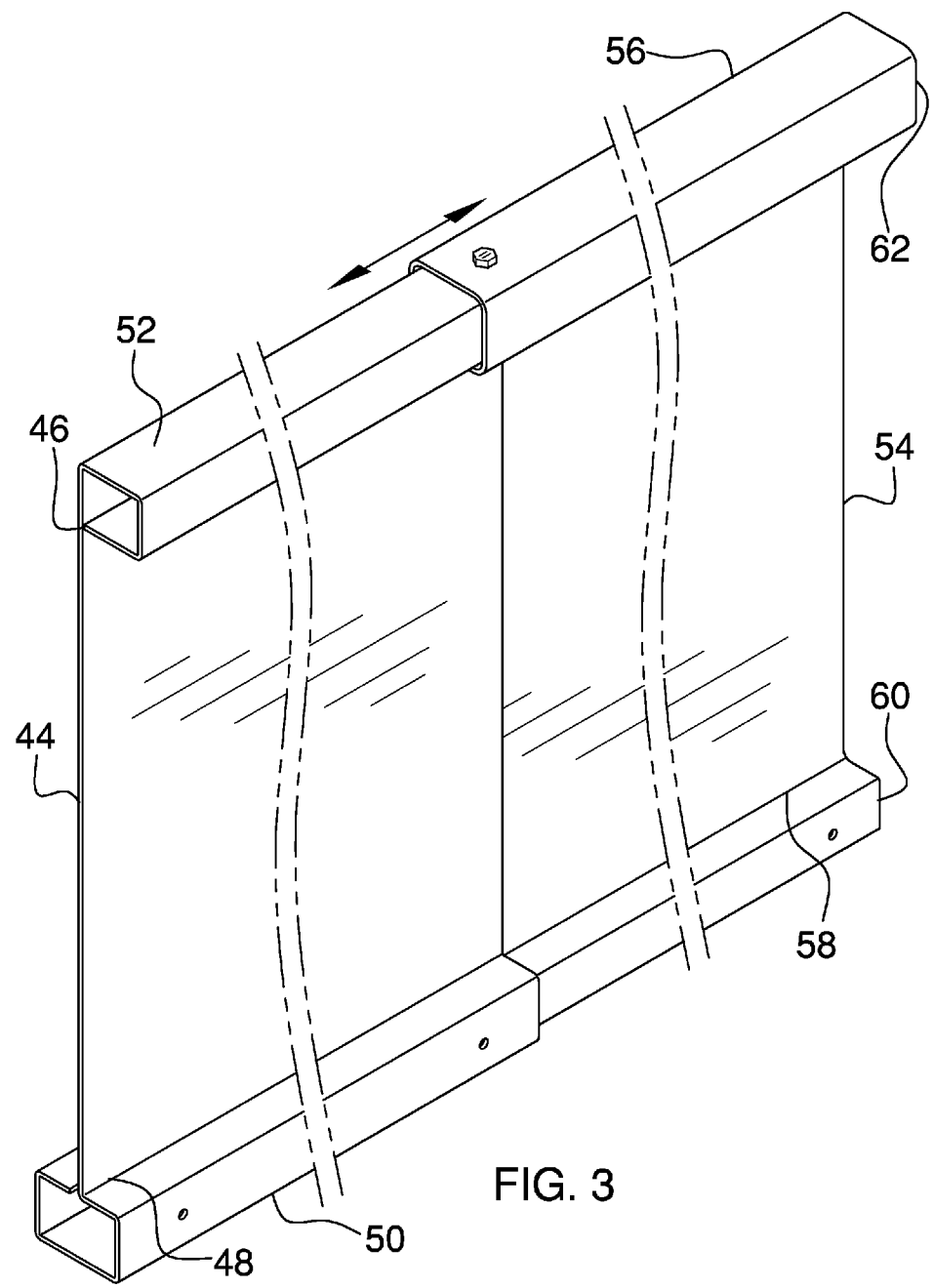
FIG. 3 is a perspective view of a first panel and a second panel of an embodiment of the disclosure.
Figure 4:
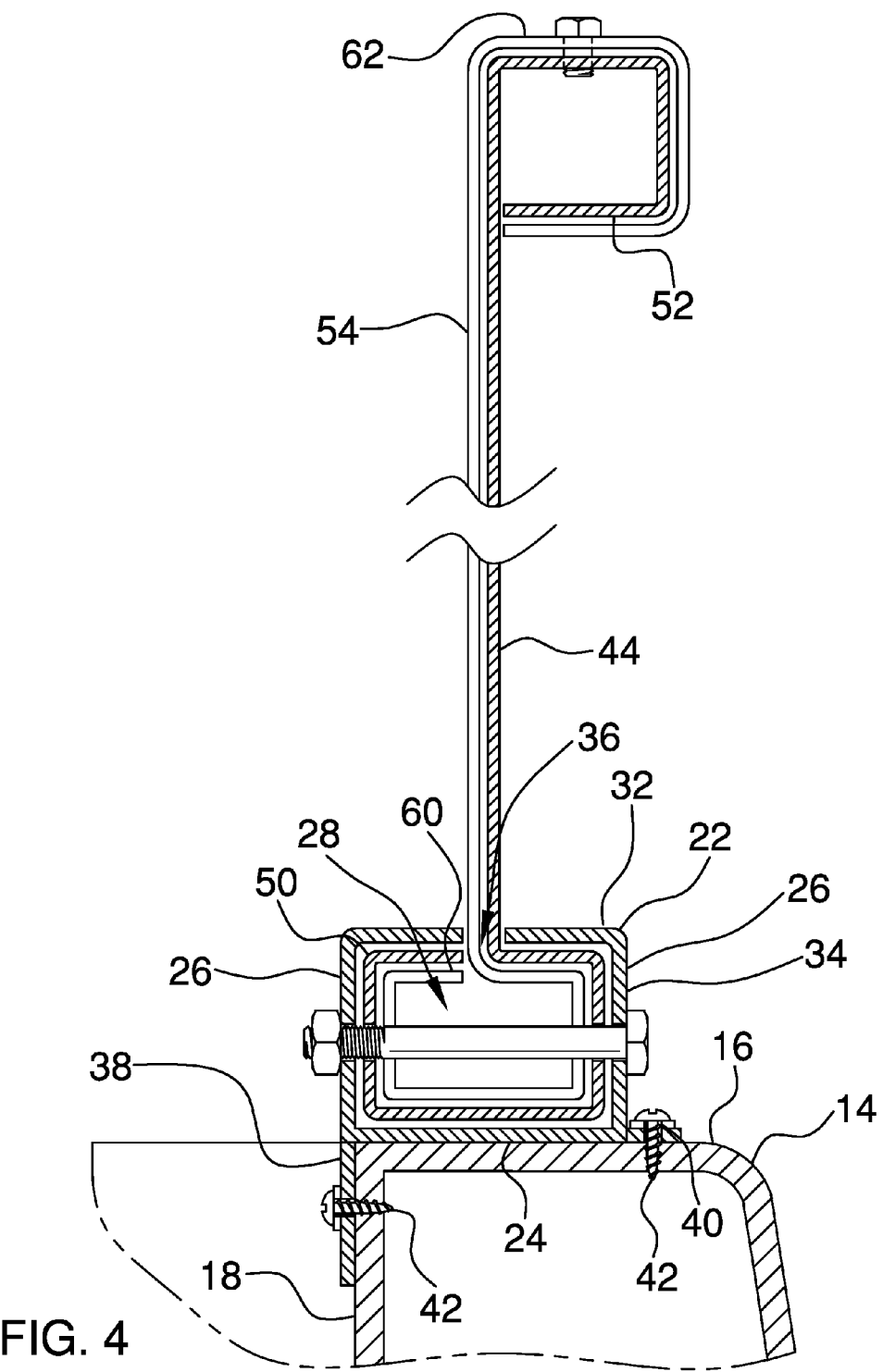
FIG. 4 is a cross sectional view taken along line 4-4 of FIG. 1 of an embodiment of the disclosure.
Figure 5:
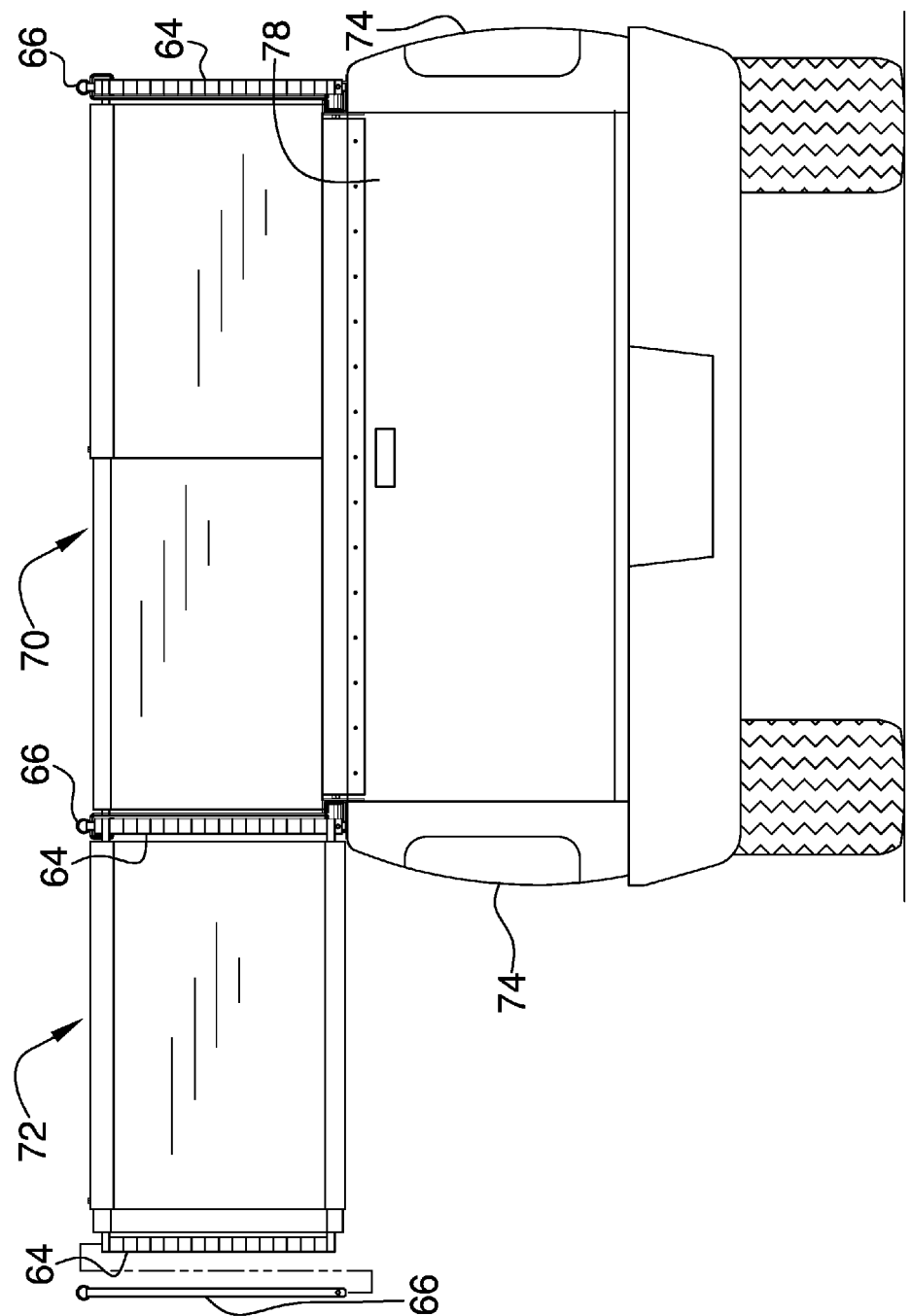
FIG. 5 is a back view of an embodiment of the disclosure showing a back wall unit in an open position.

With reference now to the drawings, and in particular to FIGS. 1 through 5 thereof, a new extension device embodying the principles and concepts of an embodiment of the disclosure and generally designated by the reference numeral 10 will be described.

As best illustrated in FIGS. 1 through 5, the truck bed extension system 10 generally comprises a vehicle 12 that has a bed 14. The bed 14 has a top edge 16 and an inwardly facing surface 18 and the vehicle 12 may be a pickup, a cargo truck or any other vehicle that has a bed 14 for carrying objects. A plurality of wall units 20 is provided and each of the wall units 20 is removably coupled to the bed 14. Each of the wall units 20 is vertically oriented on the top edge 16 such that each of the wall units 20 increases a depth of the bed 14. In this way the bed 14 is facilitated to carry an object that would otherwise be too tall.

Each of the wall units 20 comprises a track 22 that has a bottom wall 24 and a pair of side walls 26 extending upwardly from the bottom wall 24. The side walls 26 are spaced apart from each other to define a first space 28 between the pair of side walls 26. Each of the side walls 26 has a bend 30 thereon to define a first section 32 extending horizontally away from a second section 34. The first section 32 corresponding to each of the side walls 26 is directed toward each other to define a slot 36 extending between the first sections 32 corresponding to each of the side walls 26. Moreover, each of the side walls 26 is coextensive with the bottom wall 24.

The bottom wall 24 is positioned to abut the top edge 16 of the bed 14 having the side walls 26 extending upwardly therefrom. The track 22 has a first tab 38 extending downwardly from the bottom wall 24 and the first tab 38 is coextensive with the bottom wall 24. The first tab 38 abuts the inwardly facing surface 18 of the bed 14. The track 22 has a second tab 40 extending laterally away from an associated one of the side walls 26. The second tab 40 is coextensive with the bottom wall 24 and the second tab 40 abuts the top edge 16 of the bed 14. A plurality of fasteners 42 is provided and each of the fasteners 42 extends through an associated one of the first tab 38 and the second tab 40 to engage the bed 14. In this way the track 22 is retained on the bed 14 and each of the fasteners 42 may be screws or the like.

A first panel 44 is provided that has an upper edge 46 and a lower edge 48. A first shoe 50 is coupled to the lower edge 48 and the first shoe 50 is coextensive with the lower edge 48. Moreover, the first shoe 50 is substantially hollow. The first shoe 50 is slidably inserted into the first space 28 in the track 22 having the first panel 44 extending upwardly through the slot 36. A second shoe 52 is coupled to the upper edge 46 and the second shoe 52 is coextensive with the upper edge 46. Additionally, the second shoe 52 is substantially hollow.

A second panel 54 is provided that has a topmost edge 56 and a lowermost edge 58. A primary shoe 60 is coupled to the lowermost edge 58 and the primary shoe 60 is coextensive with the lowermost edge 58. Additionally, the primary shoe 60 is substantially hollow. The primary shoe 60 is slidably inserted into the first space 28 in the track 22 having the second panel 54 extending upwardly through the slot 36. Additionally, the first shoe 50 insertably receives the primary shoe 60 such that the second panel 54 is slidably coupled to the first panel 44. In this way each of the wall units 20 has a telescopically adjustable length. Thus, each of the wall units 20 is adjustable to match a variety of lengths and widths of beds on vehicles.

A secondary shoe 62 is provided and the secondary shoe 62 is coupled to the topmost edge 56. The secondary shoe 62 is coextensive with the topmost edge 56. Moreover, the secondary shoe 62 is substantially hollow. The secondary shoe 62 insertably receives the second shoe 52.

A plurality of hinges 64 is provided and each of the hinges 64 is coupled to an associated one of the wall units 20. Additionally, each of the hinges 64 is aligned with each other when each of the wall units 20 is positioned on the bed 14. A plurality of pins 66 is provided and each of the pins 66 extends through an associated pair of the hinges 64. In this way each of the wall units 20 is hingedly coupled to an associated wall unit 20. Thus, each of the wall units 20 may be selectively urged between an open position and a closed position.

The plurality of wall units 20 includes a pair of side wall units 68, a front wall unit 70 and a back wall unit 72. Each of the first 44 and second 54 panels corresponding to the side wall units 68 has a length that is greater than a length of the first 44 and second 54 panels corresponding to each of the front 70 and back 72 wall units. The bed 14 has a pair of lateral walls 74, a front wall 76 and a tailgate 78. Each of the side wall units 68 is positioned on an associated one of the lateral walls 74. The front wall unit 70 is positioned on the front wall 76 and the back wall unit 72 is positioned on the tailgate 78.

In use, the track 22 corresponding to each of the wall units 20 is fastened to the top edge 16 of the bed 14. The first shoe 50 and the second shoe 52 corresponding to each of the wall units 20 are inserted into the first space 28 corresponding to an associated one of the track 22s. Additionally, the first 44 and second 54 panels corresponding to each of the walls units 20 are manipulated to adjust the length of the corresponding wall to the associated track 22. Each of the pins 66 is extended through an associated one of the hinges 64. In this way the height of the bed 14 is increased to facilitate the bed 14 to carry the object that would otherwise be too tall. Moreover, a selected one of the pins 66 corresponding to the back wall unit 72 is selectively removed to facilitate the back wall unit 72 to be urged into the open position. In this way an interior of the bed 14 is accessible when the tailgate 78 is opened. Each of the wall units 20 is selectively removed from the associated track 22.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A truck bed extension system comprising:
   a vehicle having a bed, said bed having a top edge; and
   a plurality of wall units, each of said wall units being removably coupled to said bed, each of said wall units being vertically oriented on said top edge such that each of said wall units increases a depth of said bed wherein said bed is configured to carry an object that would otherwise be too tall, each of said plurality of wall units comprising
   a first panel having an upper edge and a lower edge,
   a track having a first space and a slot,
   a first shoe being coupled to said lower edge, said first shoe being coextensive with said lower edge, said first shoe being substantially hollow, said first shoe being slidably inserted into said first space in said track with said first panel extending upwardly through said slot, and
   a second shoe being coupled to said upper edge, said second shoe being coextensive with said upper edge, said second shoe being substantially hollow.

2. The system according to claim 1, wherein said track has a bottom wall and a pair of side walls extending upwardly from said bottom wall, said pair of side walls being spaced apart from each other to define said first space between said pair of side walls.

3. The system according to claim 2, wherein each of said side walls has a bend thereon to define a first section extending horizontally away from a second section, said first section corresponding to each of said side walls being directed toward each other to define a slot extending between said first section corresponding to each of said side walls, each of said side walls being coextensive with said bottom wall.

4. The system according to claim 2, wherein said bottom wall is positioned to abut said top edge of said bed having said side walls extending upwardly therefrom.

5. The system according to claim 2, wherein:
   said bed has an inwardly facing surface; and
   said track has a first tab extending downwardly from said bottom wall, said first tab being coextensive with said bottom wall, said first tab abutting said inwardly facing surface of said bed.

6. The system according to claim 5, wherein said track has a second tab extending laterally away from an associated one of said side walls, said second tab being coextensive with said bottom wall, said second tab abutting said top edge of said bed.

7. The system according to claim 5, each of said wall units further comprising a plurality of fasteners, each of said fasteners extending through an associated one of said first tab and said second tab to engage said bed such that said track is retained on said bed.

8. The system according to claim 1, wherein each of said wall units further comprises a second panel having a topmost edge and a lowermost edge.

9. The system according to claim 8, each of said wall units further comprising a primary shoe being coupled to said lowermost edge, said primary shoe being coextensive with said lowermost edge, said primary shoe being substantially hollow, said primary shoe being slidably inserted into said first space in said track having said primary panel extending upwardly through said slot.

10. The system according to claim 9, wherein said first shoe insertably receives said primary shoe such that said second panel is slidably coupled to said first panel thereby facilitating said wall units to have a telescopically adjustable length.

11. The system according to claim 10, further comprising a secondary shoe being coupled to said topmost edge, said secondary shoe being coextensive with said topmost edge, said secondary shoe being substantially hollow, said secondary shoe insertably receiving said second shoe.

12. The system according to claim 1, further comprising a plurality of hinges, each of said hinges being coupled to an associated one of said wall units, each of said hinges being aligned with each other when each of said wall units is positioned on said bed.

13. The system according to claim 12, further comprising a plurality of pins, each of said pins extending through an associated pair of said hinges such that each of said wall units is hingedly coupled to an associated wall unit thereby facilitating each of said wall units to be selectively urged between an open position and a closed position.

14. A truck bed extension system comprising:
   a vehicle having a bed, said bed having a top edge and an inwardly facing surface; and
   a plurality of wall units, each of said wall units being removably coupled to said bed, each of said wall units being vertically oriented on said top edge such that each of said wall units increases a depth of said bed wherein said bed is configured to carry an object that would otherwise be too tall, each of said wall units comprising:
      a track having a bottom wall and a pair of side walls extending upwardly from said bottom wall, said pair of side walls being spaced apart from each other to define a first space between said pair of side walls, each of said side walls having a bend thereon to define a first section extending horizontally away from a second section, said first section corresponding to each of said side walls being directed toward each other to define a slot extending between said first section corresponding to each of said side walls, each of said side walls being coextensive with said bottom wall, said bottom wall being positioned to abut said top edge of said bed having said side walls extending upwardly therefrom, said track having a first tab extending downwardly from said bottom wall, said first tab being coextensive with said bottom wall, said first tab abutting said inwardly facing surface of said bed, said track having a second tab extending laterally away from an associated one of said side walls, said second tab being coextensive with said bottom wall, said second tab abutting said top edge of said bed,
      a plurality of fasteners, each of said fasteners extending through an associated one of said first tab and said second tab to engage said bed such that said track is retained on said bed,
      a first panel having an upper edge and a lower edge,
      a first shoe being coupled to said lower edge, said first shoe being coextensive with said lower edge, said first shoe being substantially hollow, said first shoe being slidably inserted into said first space in said track having said first panel extending upwardly through said slot,
      a second shoe being coupled to said upper edge, said second shoe being coextensive with said upper edge, said second shoe being substantially hollow,
      a second panel having a topmost edge and a lowermost edge,
      a primary shoe being coupled to said lowermost edge, said primary shoe being coextensive with said lowermost edge, said primary shoe being substantially hollow, said primary shoe being slidably inserted into said first space in said track having said primary panel extending upwardly through said slot, said first shoe insertably receiving said primary shoe such that said second panel is slidably coupled to said first panel thereby facilitating said wall units to have a telescopically adjustable length,
      a secondary shoe being coupled to said topmost edge, said secondary shoe being coextensive with said topmost edge, said secondary shoe being substantially hollow, said secondary shoe insertably receiving said second shoe; and
   a plurality of hinges, each of said hinges being coupled to an associated one of said wall units, each of said hinges being aligned with each other when each of said wall units is positioned on said bed; and
   a plurality of pins, each of said pins extending through an associated pair of said hinges such that each of said wall units is hingedly coupled to an associated wall unit thereby facilitating each of said wall units to be selectively urged between an open position and a closed position.

* * * * *